UNITED STATES PATENT OFFICE.

AUGUST LEOPOLD LASKA AND ARTHUR ZITSCHER, OF OFFENBACH-ON-THE-MAIN, GERMANY, ASSIGNORS TO CHEMISCHE FABRIK GRIESHEIM-ELEKTRON, OF FRANKFORT-ON-THE-MAIN, GERMANY, A CORPORATION.

AZO DYESTUFFS INSOLUBLE IN WATER AND PROCESS OF MAKING THEM.

1,145,072.    Specification of Letters Patent.    Patented July 6, 1915.

No Drawing.    Application filed June 16, 1914. Serial No. 845,335.

*To all whom it may concern:*

Be it known that we, AUGUST LEOPOLD LASKA and ARTHUR ZITSCHER, citizens of the German Empire, and residents of Offenbach-on-the-Main, in the Grand Duchy of Hesse, Germany, with the post-office address Wilkelmsplatz 18 and Friedrichstrasse 31, respectively, have invented new and useful Improvements in Azo Dyestuffs Insoluble in Water and Processes of Making Them, of which the following is a specification.

Our invention relates to the production of azo dyestuffs insoluble in water and of a remarkable fastness and consists in combining a diazo compound not containing a sulfonic- or carboxylic-group with an acidyl-2-amino-3-naphthol. As diazo compounds can be used those derived from anilin, its homologues and substitution products, such as from ortho- and para-anisidin, also from chloro and nitro derivatives, from chloro- and nitroanilins, chloro- and nitrotoluidins, chloro- and nitroanisidins, from alpha- and betanaphthylamins, from amino azo compounds, the tetrazo compounds of diamino bases, such as benzidin, tolidin, dianisidin, diaminodiphenylurea, and others.

Azo dyestuffs derived from 2-acidyl-amino-3-naphthols have not hitherto been known. Compared with the insoluble dyestuffs, described by Witt in "*Berichte der deutschen chemischen Gesellschaft*" vol. 29, page 2949, and in the German Letters Patent No. 93312, derived from acidyl-1-amino-4-naphthols the present dyestuffs are distinguished by their essentially greater fastness to chlorin.

The dyestuffs having probably the formula:

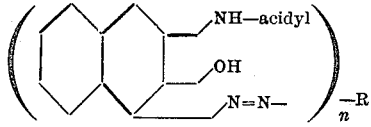

wherein "R" means an aromatic radical and "$n$" a number, less than 3, can be used for the production of pigment colors, they can be produced also on the fiber according to the processes usual for the production of ice-colors. When the operation is such, that the cotton goods, which are impregnated with the alkaline solution of an acidyl-2-amino-3-naphthol, are developed with a diazo compound without previously drying, especially stronger shades are obtained than with the well known dyestuffs derived from acidyl-1-amino-4-naphthol. The combination can be effected in an acid, neutral or alkaline solution according to the kind of diazo compound.

The following examples illustrate the invention, the parts being by weight:

Example 1.

A diazo solution, prepared in the usual manner from 16.8 parts of nitroanisidin 4.1.2. ($OCH_3 : NH_2 : NO_2 = 1:2:4$), is poured while well stirring into an aqueous suspension of 27 parts of benzoyl-2-amino-3-naphthol, prepared by dissolving the latter in diluted caustic soda lye and precipitating with diluted acetic acid. The dyestuff separates in red flakes, it is filtered, when the combination is complete, washed until neutral and preferably used in the form of a paste. When dry it is a brilliant red powder and yields, when converted into lakes, red pigment colors of an excellent fastness to oil.

*Production of the dyestuff on the fiber.—*
The goods are impregnated with the following solution: 12 grams of benzoyl-2-amino-3-naphthol, 20 ccm. of caustic soda-lye 34° Bé., 25 grams of ricinoleate of soda are mixed to a paste and dissolved in 500 ccm. of boiling water, and the whole is made up to 1 liter.

The well dried goods are printed with a mixture of: 500 ccm. of the diazo solution, 500 grams of tragacanth-thickening 1:20, 25 ccm. of a solution of sodium acetate 1:1.

For preparing the diazo solution 16.8 grams of nitro-anisdin 4.1.2 ($OCH_3 : NH_2 : NO_2 = 1:2:4$) are diazotized in the usual manner, to the solution 12.5 gr. of aluminium sulfate are added and the whole is made up to 500 ccm. After printing the goods are dried, washed and soaped at 50–70°. In this manner deep red prints are obtained.

By producing the dyestuff on cotton-yarn according to the process described in the specification of the application Serial No. 795456, a brilliant red of an excellent fastness is obtained.

*Example 2.*

The bleached or raw cotton-yarn, previously well boiled with carbonate of soda or caustic soda, is impregnated at about 40° C., with a solution of benzoyl-2.3-amino-naphthol as described in Example 1, well wrung out and having cooled dyed in a dye-bath of the following constitution: 500 ccm. of the diazo solution are mixed with 42 ccm. of a solution of cupric chlorid 40° Bé., 12 ccm. of a solution of chromic acid 1:10 and 110 ccm. of aluminium sulfate 12° Bé. and shortly before dyeing 50 ccm. of a solution of sodium acetate 1:1 are added. The whole is made up to 1 liter.

*Diazo solution.*—24 grams of dianisidin-base are dissolved in 21 ccm. of hydrochloric acid of 20° Bé. and 250 ccm. of boiling water; to the cooled solution are added 200 grams of ice and 10 ccm. of hydrochloric acid of 20° Bé. and then 16 grams of sodium nitrite dissolved in 50 grams of water are allowed to run in while well stirring. The whole is made up to 1 liter. After dyeing the yarn is well wrung out, well washed and soaped at 70–80° C. In this manner beautiful reddish blue tints are obtained.

Instead of 2-benzoylamino-3-naphthol its substitution products, such as 2-halogenbenzoylamino-3-naphthol or 2-nitro-benzoyl-amino-3-naphthol, or other acidyl derivatives of 2.3-amino-naphthol can be used, such as 2-acetylamino-3-naphthol, 3.3¹-dioxy-2.2¹-dinaphtylurea and so on.

Now what we claim and desire to secure by Letters Patent is the following:

1. As new articles the azo dyestuffs, insoluble in water, which may be obtained by combining a diazo compound not containing a sulfonic- or carboxylic-group with an acidyl-2-amino-3-naphthol, which dyestuffs have probably the formula

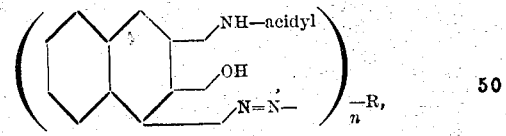

wherein "R" means an aromatic radical and "$n$" a number, less than 3, which dyestuffs are adapted to yield when converted into lakes pigment colors of an excellent fastness to oil.

2. Process of making azo dyestuffs, insoluble in water, consisting in combining a diazo compound not containing a sulfonic- or carboxylic-group with an acidyl-2-amino-3-naphthol.

3. Process of making azo dyestuffs, insoluble in water, consisting in combining a diazo compound not containing a sulfonic- or carboxylic-group with an acidyl-2-amino-3-naphthol on the fiber.

That we claim the foregoing as our invention, we have signed our names in presence of two witnesses, this fourth day of June, 1914.

AUGUST LEOPOLD LASKA.
ARTHUR ZITSCHER.

Witnesses:
HERMANN WEIL,
FRIEDRICH QUEHL.